(12) United States Patent
Nord et al.

(10) Patent No.: US 11,930,412 B2
(45) Date of Patent: Mar. 12, 2024

(54) SYSTEM AND METHOD FOR COMMUNICATING RADIO ACCESS TECHNOLOGY CHARACTERISTICS

(71) Applicant: Sony Group Corporation, Tokyo (JP)

(72) Inventors: Lars Nord, Lund (SE); Rickard Ljung, Lund (SE); Daniel Lonnblad, Lund (SE)

(73) Assignee: Sony Group Corporation, Tokyo (JP)

( * ) Notice: Subject to any disclaimer, the term of this patent is extended or adjusted under 35 U.S.C. 154(b) by 205 days.

(21) Appl. No.: 17/431,300

(22) PCT Filed: Jan. 6, 2020

(86) PCT No.: PCT/US2020/012305
§ 371 (c)(1),
(2) Date: Aug. 16, 2021

(87) PCT Pub. No.: WO2020/171892
PCT Pub. Date: Aug. 27, 2020

(65) Prior Publication Data
US 2022/0141740 A1    May 5, 2022

(30) Foreign Application Priority Data
Feb. 18, 2019    (SE) .................................. 1930066-4

(51) Int. Cl.
*H04W 36/08*    (2009.01)
*H04W 36/22*    (2009.01)
(Continued)

(52) U.S. Cl.
CPC ........... *H04W 36/08* (2013.01); *H04W 36/22* (2013.01); *H04W 36/30* (2013.01); *H04W 68/005* (2013.01)

(58) Field of Classification Search
CPC ..... H04W 36/08; H04W 36/22; H04W 36/30; H04W 68/005
See application file for complete search history.

(56) References Cited

U.S. PATENT DOCUMENTS

2010/0316034 A1    12/2010  Burbidge et al.
2011/0195714 A1    8/2011   Sawinathan
(Continued)

FOREIGN PATENT DOCUMENTS

CN    101690134 A    3/2010
CN    107431999 A    12/2017
(Continued)

OTHER PUBLICATIONS

International Search Report and Written Opinion from corresponding International Application No. PCT/US2020/012305 dated Apr. 29, 2020, 50 pages.
(Continued)

*Primary Examiner* — Justin Y Lee
(74) *Attorney, Agent, or Firm* — Tucker Ellis LLP

(57) ABSTRACT

A wireless communication network (102) can employ techniques for the network (102) to indicate specific radio access characteristics to be used by a user equipment (100) 5 when responding to a paging message. The network (102) can indicate a specific radio access technology (RAT) that the UE (100) should use when connecting to the network (102). In this manner, the UE (100) can initiate a connection using the desired RAT rather than first initiating a connection with an incorrect RAT and performing a handover or network reconfiguration.

5 Claims, 10 Drawing Sheets

(51) Int. Cl.
*H04W 36/30* (2009.01)
*H04W 68/00* (2009.01)

(56) References Cited

U.S. PATENT DOCUMENTS

| | | |
|---|---|---|
| 2013/0203452 A1 | 8/2013 | Awoniyi et al. |
| 2015/0092630 A1 | 4/2015 | Lin et al. |
| 2015/0304987 A1 | 10/2015 | Jin |
| 2016/0135231 A1 | 5/2016 | Lee et al. |
| 2017/0041900 A1* | 2/2017 | Wallentin ............... H04W 68/02 |
| 2017/0150470 A1 | 5/2017 | Kalapatapu et al. |
| 2018/0192337 A1 | 7/2018 | Ryu et al. |
| 2022/0095186 A1* | 3/2022 | Zhang ............... H04W 36/0044 |

FOREIGN PATENT DOCUMENTS

| | | |
|---|---|---|
| CN | 109076437 A | 12/2018 |
| EP | 2186301 A1 | 5/2010 |
| EP | 3232720 A1 | 10/2017 |
| WO | 2013132289 A1 | 9/2013 |
| WO | 2015035551 A1 | 3/2015 |
| WO | 2016148617 A1 | 9/2016 |
| WO | 2018031603 A1 | 2/2018 |
| WO | 2018062977 A1 | 4/2018 |

OTHER PUBLICATIONS

Office Action from corresponding Swedish Application No. 1930066-4 dated Aug. 9, 2019.
Office Action from corresponding Chinese Application No. 202080014382.7 dated Nov. 11, 2023, 9 pages.

* cited by examiner

SYSTEM AND METHOD FOR COMMUNICATING RADIO ACCESS TECHNOLOGY CHARACTERISTICS

RELATED APPLICATION DATA

This application claims the benefit of Swedish Patent Application No. 1930066-4 filed Feb. 18, 2019, the disclosure of which is incorporated herein by reference in its entirety.

TECHNICAL FIELD OF THE INVENTION

The technology of the present disclosure relates generally to cellular network operation and, more particularly, to a system and method for communicating radio access technology characteristics to a wireless communications device.

BACKGROUND

Network communications that have been developed as part of the Third Generation Partnership Project (3GPP) include a paging procedure implemented to either setup a voice call or a data connection. With the introduction of Internet of Things (IoT) technologies and thereby adding cellular IoT improvements in the network, further paging procedure functionality would be beneficial.

When a user equipment (UE) is in an idle mode, the UE is responsible for deciding which radio access to use for camping in a cell. In some situations, the network may need to perform a handover or reconfiguration to move the UE to a second RAT or change the radio characteristics after a connection is performed in an "incorrect" RAT or with "incorrect" RAT characteristics. This leads to problems and reduced performance since additional signaling is required between the UE and network and between network nodes such as RAN nodes and core network nodes.

SUMMARY

In view of the foregoing, it is desirable to enhance the way that a user equipment (UE) connects to a network in response to a paging message. When a UE is connecting to the network based on a paging message, the network may already have information indicating that a different radio access technology (RAT) or other radio access characteristics may be advantageously used by the UE in order to improve system performance or to make use of RAT specific functions in response to quality of service (QoS) requirements of the packet data unit (PDU) session data flow or load conditions in one or more RAT. In these situations, the network may avoid performing a subsequent handover or reconfiguration to move the UE to a second RAT or change the radio characteristics after the connection is performed in an "incorrect" RAT or with "incorrect" RAT characteristics.

Disclosed are techniques for the network to indicate specific radio access characteristics to be used by the UE when responding to the paging message. The network can indicate a specific radio access technology (RAT) that the UE should use when connecting to the network. In this manner, the UE can initiate a connection using the desired RAT rather than first initiating a connection with an incorrect RAT and performing a handover or network reconfiguration.

According to one aspect of the disclosure, a method for initiating a connection to a target wireless communications network, carried out by a wireless communications device includes: camping, in an idle mode or an inactive mode, on a first cell of a first wireless communications network; receiving a paging message containing specified network characteristics or an indication of specified network characteristics to be used by the wireless communications device in connecting to the target wireless communications network; and initiating a connection to the target wireless communications network using the specified network characteristics over one of the first cell or a second cell of the target wireless communications network, based on the specified network characteristics, wherein the target wireless communications network is one of the first wireless communications network or a second wireless communications network.

According to one embodiment of the method, the method further includes determining whether the wireless communications device can initiate a connection to the target wireless communications network on the first cell using the specified network characteristics, wherein initiating the connection to the target wireless communications network is based on the determination of whether the wireless communications device can initiate the connection on the first cell.

According to one embodiment of the method, the specified network characteristics include a radio access technology (RAT).

According to one embodiment of the method, the paging message is received using a different RAT than the RAT included in the specified network characteristics.

According to one embodiment of the method, the specified network characteristics include at least one of a target cell ID, a frequency band, a core network type or an indication of a portion of bandwidth within a network carrier of the target network wireless communication network.

According to one embodiment of the method, the wireless communications device determines that the wireless communications device cannot initiate the connection to the target wireless communications network on the first cell using the specified network characteristics, and the method further comprises: performing a cell re-selection to the second cell to match the specified network characteristics; and initiating the connection to the target network via the second cell using the specified network characteristics.

According to one aspect of the disclosure, a method performed by a radio access node (RAN) or a core network in a first wireless communications network of transmitting a paging message to a wireless communications device, comprising determining specified network characteristics for the wireless communications device to use for establishing a connection with a target wireless communications network, wherein the target wireless communications network is the first wireless communications network or a second wireless communications network; and transmitting a paging message to the wireless communications device, wherein the paging message includes the specified network characteristics or an indication of the specified network characteristics.

According to one embodiment of the method, the specified network characteristics include a radio access technology (RAT).

According to one embodiment of the method, the method further includes establishing a connection with the wireless communications device (100) using the RAT.

According to one embodiment of the method, the RAT is determined based at least partially on quality of service (QoS) parameters from a Protocol Data Unit (PDU) session corresponding with received downlink data intended for the wireless communications device.

According to one embodiment of the method, the RAT is determined based at least partially on load conditions of a plurality of RATs.

According to one embodiment of the method, the RAT is determined based at least partially on stored radio capabilities of the wireless communications device (100).

DETAILED DESCRIPTION OF EMBODIMENTS

Figure 1:
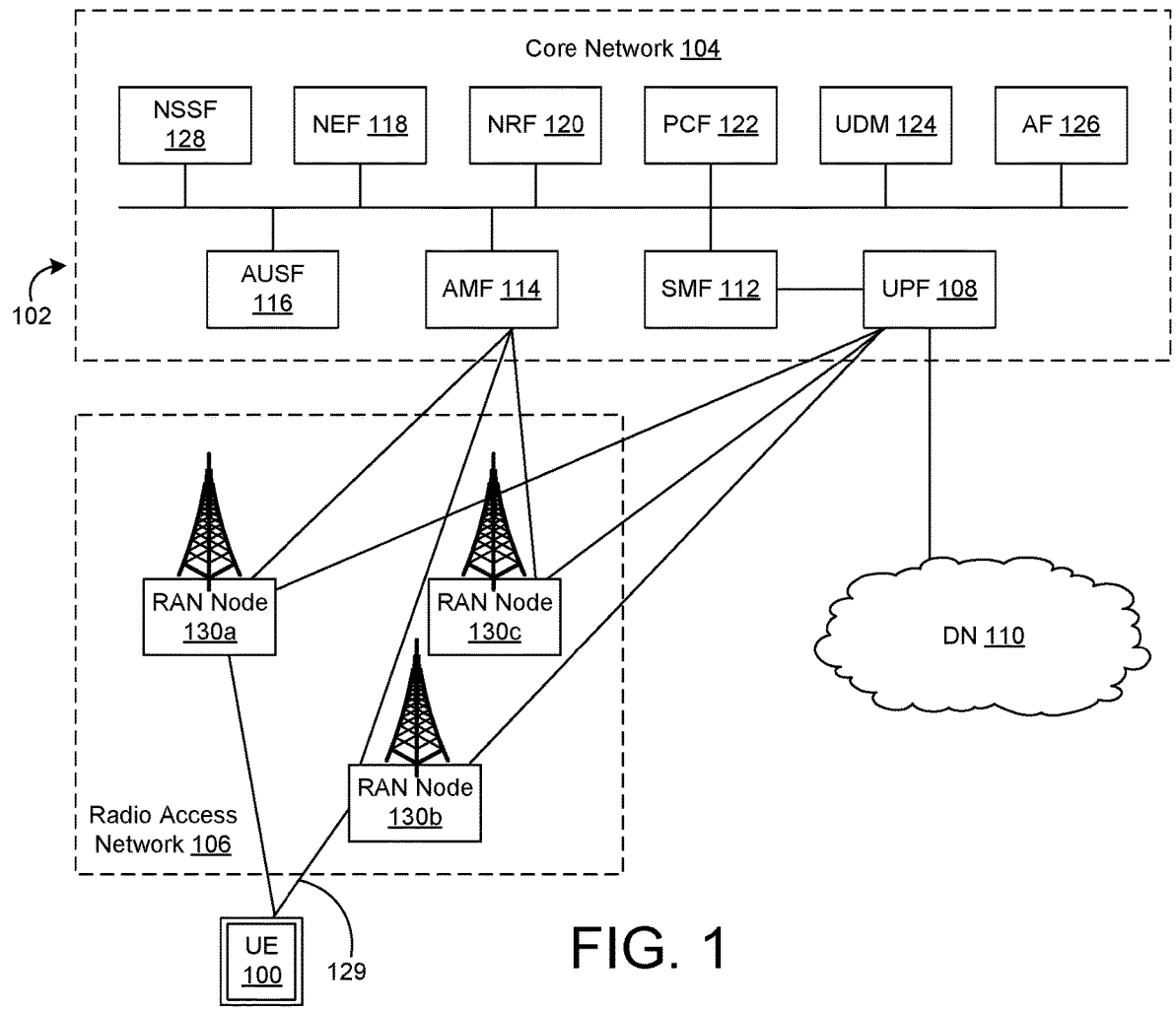
FIG. 1 is a schematic diagram of a representative operational network environment for an electronic device, also referred to as a user equipment.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

As used herein, the term "inactive" or "inactive state" refers to a state in which a user equipment (UE) 100 is registered to the wireless network and is in a connected state as seen from the Core Network (CM Connected), but is not continuously available to receive data from a RAN node. An example of such an inactive state is RRC_Inactive as defined by 3GPP technical specifications.

As used herein, the term "idle" or "idle state" refers to a state in which a user equipment (UE) 100 is not registered to the wireless network, is in a disconnected state as seen from the Core Network, and is also not available to receive data from a RAN node. An example of such an inactive state is RRC_Idle as defined by 3GPP technical specifications.

System Architecture

FIG. 1 is a schematic diagram of an exemplary network environment in which the disclosed techniques are implemented. It will be appreciated that the illustrated network environment is representative and other environments or systems may be used to implement the disclosed techniques. Also, various network functions may be carried out by a single device, such as a core network server, or may be carried out in a distributed to manner across nodes of a computing environment.

Figure 2:
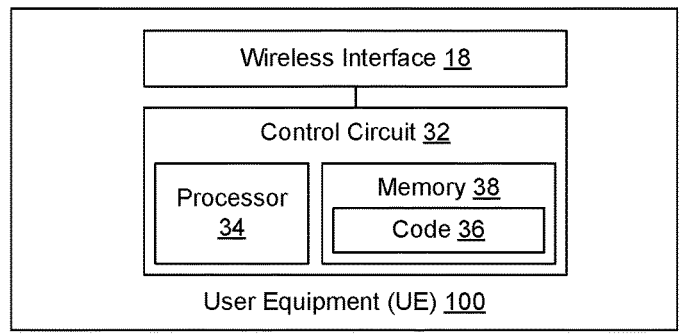
FIG. 2 is a schematic diagram of an exemplary user equipment.

The network environment is relative to an electronic device, such a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, and an internet of things (IoT) device. The UE 100 also may be referred to as a wireless communications device. With additional reference to FIG. 2, among other components, the UE 100 may include a control circuit 32 that is responsible for overall operation of the UE 100, including controlling the UE 100 to carry out the operations described in greater detail below. The control circuit 32 includes a processor 34 that executes code 36, such as an operating system and/or other applications. The functions described in this disclosure document may be embodied as part of the code 36 or as part of other dedicated logical operations of the UE 100. The logical functions and/or hardware of the UE 100 may be implemented in other manners depending on the nature and configuration of the UE 100. Therefore, the illustrated and described approaches are just examples and other approaches may be used including, but not limited to, the control circuit 32 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 36 and any stored data (e.g., data associated with the operation of the UE 100) may be stored on a memory 38. The code 36 may be embodied in the form of executable logic routines (e.g., a software program) that are stored as a computer program product on a non-transitory computer readable medium (e.g., the memory 38) of the UE 100 and are executed by the processor 34. The functions described as being carried out by the UE 100 may be thought of as methods that are carried out by the UE 100.

The memory 38 may be, for example, one or more of a buffer, a flash memory, a hard drive, a removable media, a volatile memory, a non-volatile memory, a random access memory (RAM), or other suitable device. In a typical arrangement, the memory 38 includes a non-volatile memory for long term data storage and a volatile memory that functions as system memory for the control circuit 32. The memory 38 is considered a non-transitory computer readable medium.

The UE 100 includes communications circuitry that enables the UE 100 to establish various communication connections. For instance, the UE 100 includes the wireless interface 18 over which wireless communications are conducted with the RAN Nodes 130 (e.g. base station). Other communications may be established with the UE 100, such as Wi-Fi communications, wired connections, etc. The wireless interface 18 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the UE 100 may include, but are not limited to, user inputs (e.g., buttons, keypads, touch surfaces, etc.), a display, a microphone, a speaker, a sensor, a jack or electrical connector, a rechargeable battery and power supply unit, a SIM card, a motion sensor (e.g., accelerometer or gyro), a GPS receiver, and any other appropriate components.

The network environment includes one or more wireless communication networks 102 that are configured in accordance with one or more 3GPP standards, such as a 3G network, a 4G network or a 5G network. The wireless communication network 102 also may be referred to as a 3GPP network 102. The 3GPP network 102 includes a core network (CN) 104 and a radio access network (RAN) 106. FIG. 1 is a service-based representation to illustrate the 3GPP network 102, but other representations are possible, such as a reference point representation. The CN 104 includes a user plane function (UPF) 108 that provides an interface via tunnel to a data network (DN) 110. The DN 110 represents operator services, connection to the Internet, third party services, etc.

The core network 104 can include one or more servers that host a variety of network management functions, illustrated examples of which include, but are not limited to, the UPF 108, a session management function (SMF) 112, a core access and mobility management function (AMF) 114, an authentication server function (AUSF) 116, a network exposure function (NEF) 118, a network repository function (NRF) 120, a policy control function (PCF) 122, a unified data management (UDM) 124, an application function (AF) 126 and a network slice selection function (NSSF) 128.

The RAN 106 includes a plurality of RAN nodes 130. In the illustrated example, there are three RAN nodes 130a, 130b, and 130c. Fewer than or more than three RAN nodes 130 may be present. Each RAN node 130 may be a base station such as an evolved node B (eNB) base station or a 5G generation gNB base station. The RAN nodes 130 may be more generically referred to as access network nodes. A radio link 129 may be established between the UE 100 and one of the RAN nodes 130 for providing wireless radio services to the UE 100. The RAN node 130 to which the radio link 129 is established will be referred to as the servicing RAN node 130 or servicing base station. Other RAN nodes 130 may be within communication range of the UE 100. The RAN 106 is considered to have a user plane and a control plane, the control plane implemented with radio resource control (RRC) signaling between the UE 100 and the RAN node 130. Another control plan between the UE 100 and the CN 104 may be present and implemented with non-access stratum (NAS) signaling.

Typically, each RAN node 130 includes a control circuit (not illustrated) that is responsible for overall operation of the RAN node 130, including controlling the RAN node 130 to carry out the operations described in herein. In an exemplary embodiment, the control circuit may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit in order to carry out operation of the RAN node 130. The RAN node 130 also includes a wireless interface (not shown), such as a radio transceiver, for establishing an over the air connection with the UE 100. The RAN node 130 also includes an interface (not shown) to the core network 104, which typically includes operative connectivity to the AMF 114 and the UPF 108. The RAN node 130 also includes an interface (not shown) to one or more neighboring RAN nodes 130 for conducting network coordination in the RAN 106. It should be appreciated that a UE 100 can establish communications through a particular RAN node 130 while within the cell corresponding to the RAN node 130.

A core network function server (not shown) of the core network 104 may be responsible for carrying out one or more of the core network management functions. For example, the server may execute logical instructions (e.g., in the form of one or more software applications) to carry out one or more of the functions of the core network 104. For this purpose, the server may be implemented as a computer-based system that is capable of executing computer applications (e.g., software programs) that, when executed, carry out functions of the server. As is typical for a computing platform, the server may include a non-transitory computer readable medium, such as a memory that stores data, information sets and software, and a processor for executing the software. The processor and the memory may be coupled using a local interface. The local interface may be, for example, a data bus with accompanying control bus, a network, or other subsystem. The server may have various input/output (I/O) interfaces for operatively connecting to various peripheral devices, as well as one or more communications interfaces. The communications interface may include for example, a modem and/or a network interface card. The communications interface may enable the server to send and receive data signals to and from other computing devices in the core network, in the RAN 106, and/or in other locations as is appropriate.

Communicating RAT Characteristics as Part of a Paging Procedure

Techniques will be described for communicating radio access technology (RAT) characteristics to a user equipment (UE) 100 with a paging message. The paging message can include a new RAT characteristic field. The RAT characteristic field may include information related to RAT characteristics or other network characteristics directly or it may include data that is indicative of such information. Alternatively, the RAT characteristics field may be in the form of an identifier such as a flag, information bit/bits or similar where the identifier is indicative to the UE 100 that the paging message is coupled with specific RAT characteristics and/or other network characteristics. This may be the case, for example, if the RAT characteristics information is too large to fit into the paging message directly. In situations where such an identifier is used, the UE 100 responds to the paging message by connecting to the network and determining the RAT characteristics and/or other specified network characteristics by detecting additional control signaling transmitted from the network, prior to acting on the paging message. Hence, the identifier may point to a specific control transmission to provide information indicative of the RAT characteristics and/or other specified network characteristics information. For example the identifier can inform the UE 100 of a specific set of upcoming time and frequency resources where the UE 100 can receive the RAT characteristics and/or additional specified network characteristics information. The identifier may point to a system information message that may have been or will be transmitted by the network. The identifier may also point to control signaling transmitted in a control message by the network.

Using the new RAT characteristic field or the identifier, the network 102 can indicate a specific RAT, which the network 102 indicates that the UE 100 should attempt to use when responding to the paging message. In this manner, the network 102 can control radio access so that a UE 100 camping on a cell in an operator network 102 may connect using a certain technology. For example, different RATs that can be indicated are Wide-Band Code Division Multiple Access (WCDMA), Narrowband Internet of Things (NB-IOT), Long-Term Evolution (LTE) or 5G New Radio (5G NR), among others.

Other enhancements to the paging message include other beneficial information within the RAT characteristics field that can include additional specified network characteristics such as a target cell ID, a target wireless communications network, a frequency band or an indication of a specific bandwidth portion within a network carrier.

It should be noted that for UEs 100 camping in a network 102 in idle mode, the core network 104 is responsible for storing the radio access related capabilities of such UE 100. The UE 100 is generally responsible for transmitting its UE capabilities upon attaching to a network 102, which then may be stored in the core network 104, specifically in the AMF 114.

As here disclosed are techniques for the network 102 to indicate specific radio access characteristics to be used by the idle UE 100 when responding to the paging message. The network can indicate a specific radio access technology (RAT) that the UE 100 should use when connecting to the network 102. When a UE 100 in idle mode is camping in a cell, this proposed functionality of indicating specific radio access characteristics can take UE radio access capabilities into account, so that the UE 100 will be indicated to connect to the network using characteristics that the UE 100 is capable of supporting. As one example, the network 102 can take into account the UE 100 support capabilities of different radio access technologies so that an indication of a specific RAT in the paging message is supported by the UE 100 receiving the paging message. Hence, when the core network 104 determines the specified network characteristics that the UE 100 should use, information in the AMF 114 related to the UE 100 capabilities can be taken into account.

It should be further noted that if a UE 100 is in an inactive state in a network 102, the RAN 106 may be responsible for storing the radio access related capabilities of such UE 100. The UE 100 is generally responsible for transmitting its UE capabilities upon attaching to a network, and this information may be shared between the core network 104 and RAN 106 for a UE 100 in an inactive state.

Also disclosed herein are techniques for the network 102 to indicate specific radio access characteristics to be used by the inactive UE 100 when responding to the paging message. The network 102 can indicate a specific radio access technology (RAT) that the UE 100 should use when connecting to the network 102. When a UE 100 in inactive mode is camping in a cell 105, this proposed functionality of indicating specific radio access characteristics can take UE 100 radio access capabilities into account, so that the UE 100 will be indicated to connect to the network using characteristics which the UE 100 is capable of supporting. As one example the RAN 106 network can take the UE 100 support of different radio access technologies into account so that an indication of a specific RAT or other network characteristics in the paging message is supported by the UE 100 receiving the paging message. Hence, when the RAN 106 network determines the specified network characteristics that the UE 100 should use, information related to the UE 100 capabilities can be taken into account and therefore may be stored within the RAN 106.

In general, methods for initiating a connection to a target wireless communications network (e.g. first wireless communications network 102 or second wireless communications network 202) can be carried out by a wireless communications device such as a user equipment 100. The methods involve the wireless communications device camping in an idle mode or an inactive mode, on a first cell 105 of a first wireless communications network 102. The wireless communications device can receive a paging message containing specified network characteristics or an indication of specified network characteristics to be used by the wireless communications device in connecting to the target wireless communications network. The wireless communications device can initiate a connection to the target wireless communications network using the specified network characteristics over one of the first cell 105 or a second cell 205 of the target wireless communications network, based on the specified network characteristics.

Figure 3:
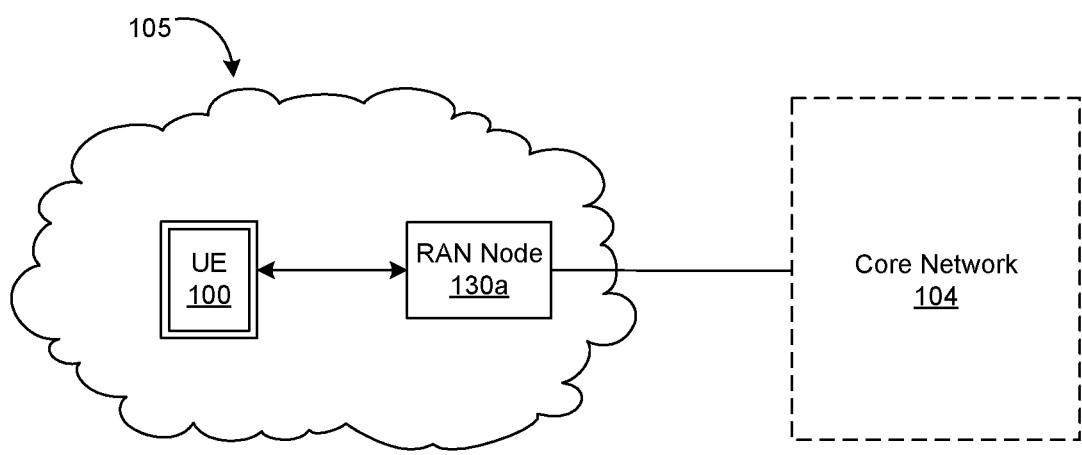
FIG. 3 is a schematic diagram of a user equipment within a first cell.

As shown in FIG. 3, a user equipment 100 can be camping on a first cell 105 corresponding to a RAN node 130*a*. It should be appreciated that while the first cell 105 is depicted as being associated with a single RAN node 130*a*, a cell can correspond to one or more RAN nodes 130. While camping on the first cell 105, the UE 100 can be in either an idle mode or an inactive mode.

Figure 4A:
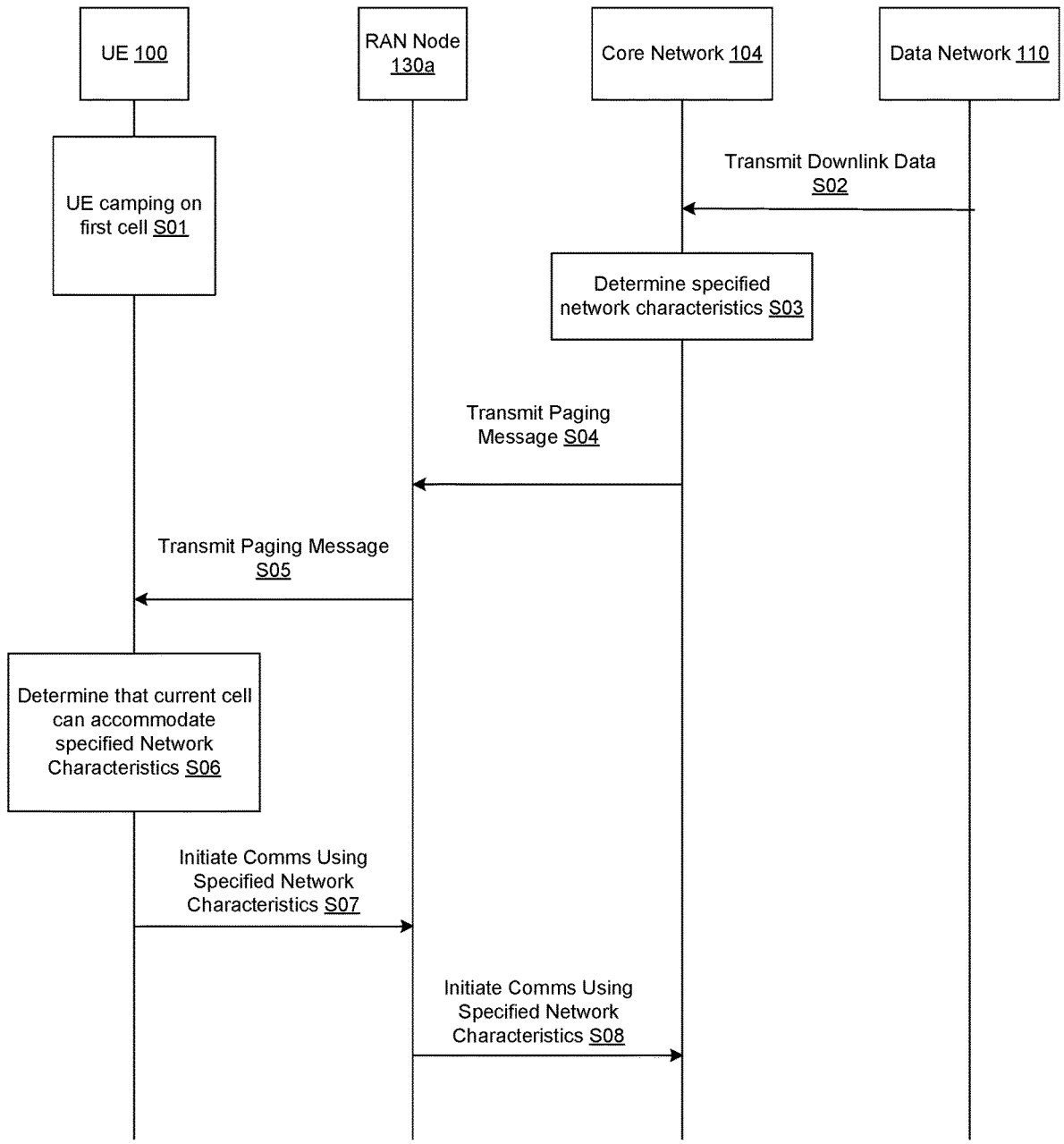
FIG. 4A is an exemplary signaling diagram for signaling among the user equipment and network element during idle mode mobility of the user equipment.
Figure 4B:
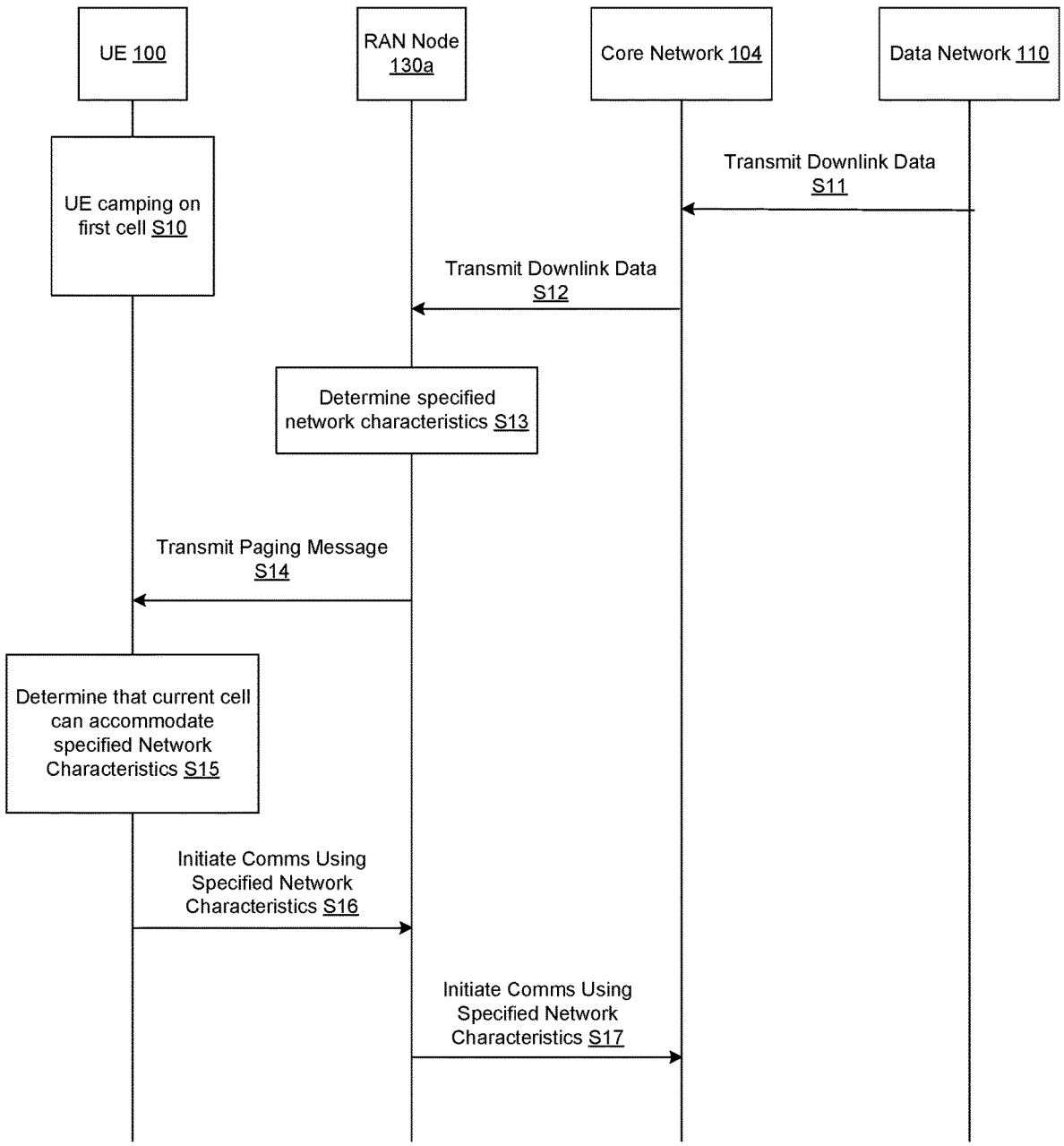
FIG. 4B is an exemplary signaling diagram for signaling among the user equipment and network element during inactive mode mobility of the user equipment.

With reference to FIG. 4A and FIG. 4B, similar techniques and methods can be implemented, but using different network elements in the cases when a UE 100 is in an idle mode or an inactive mode. In other words, even though the methods disclosed herein can be performed by different network elements (e.g. RAN node 130 or the core network 104), the methods are applicable when a UE 100 is camping on the first cell 105 in an idle mode or an inactive mode.

Turning now to FIG. 4A, a signaling diagram is presented, representing an exemplary embodiment of signaling while the UE 100 is in an idle mode. At step S01, the UE 100 is camping on the first cell 105 in idle mode. At step S02, the core network 104 receives downlink data intended for the UE 100 from a data network 110. Upon receipt of the downlink data, the core network 104 at step S03 can determine specified network characteristics including at least one of a specified RAT, a target cell ID, a target wireless communications network, a frequency band or an indication of a specific bandwidth portion within a network carrier. The core network 104 can determine the specified network characteristics based on the downlink data received from the data network 110 and also take into account stored information about the UE 100 radio access capabilities. For example, the core network 104 can base the specified network characteristics on the corresponding PDU session and quality of service (QoS) parameters related to the corresponding data flow. Furthermore, the core network 104 could also consider temporary load conditions in different RATs.

At step S04, the core network 104 transmits a paging message to RAN node 130*a*. The paging message contains the specified network characteristics or an indication of the specified network characteristics as described above. At step S05, the RAN node 130*a* transmits the paging message containing the specified network characteristics or the indication of the specified network characteristics to the UE 100. At step S06, the UE 100 determines that the current cell (here, the first cell 105) can accommodate a connection using the specified network characteristics. For example, the UE 100 can determine whether the RAT specified and bandwidth part in the paging message can be supported by the current cell. After determining that the current cell can accommodate the specified network characteristics, at steps S07 and S08, the UE 100 initiates communications with the core network 104 through the RAN node 130*a* using the specified network characteristics. Initiating communications with the network 102 using the specified network characteristics allows the UE 100 to initiate communications using the correct network characteristics (e.g. RAT), thus eliminating the need to perform a handover or reconfiguration after establishing a connection.

FIG. 4B depicts a signaling diagram representing an exemplary embodiment of signaling while the UE 100 is in an inactive mode. At step S10, the UE 100 is camping on the first cell 105 in inactive mode. At step S11, the core network 104 receives downlink data intended for the UE 100 from a data network 110. Upon receipt of the downlink data, the core network 104 at step S12 transmits the downlink data to the RAN node 130*a*. Recognizing that the UE 100 is camping on the first cell 105 in inactive mode, at step S13, the RAN node 130*a* can determine specified network characteristics including at least one of a specified RAT, a target cell ID, a target wireless communications network, a frequency band or an indication of a specific bandwidth portion within a network carrier. The RAN node 130*a* can determine the specified network characteristics based on the downlink data received from the data network 110 and core network 104, and also take into account stored information about the UE 100 radio access capabilities. For example, the RAN node 130*a* can base the specified network characteristics on the corresponding PDU session and quality of service (QoS) parameters related to the corresponding data flow. Furthermore, the RAN node 130*a* could also consider temporary load conditions in different RATs.

At step S14, the RAN node 130*a* transmits a paging message to the UE 100. The paging message contains the specified network characteristics or an indication of the specified network characteristics as described above. Steps S15, S16, and S17 correspond with steps S06, S07, and S08. The UE 100 determines that the current cell can accommodate the specified network characteristics, and proceeds to initiate communications with the core network 104 through the first cell 105 on which it was camped. Initiating communications with the network 102 using the specified network characteristics allows the UE 100 to initiate communications using the correct network characteristics (e.g. RAT), thus eliminating the need to perform a handover or reconfiguration after establishing a connection.

In one example that corresponds with the signaling diagrams of FIG. 4A and FIG. 4B, the core network 104 or RAN node 103*a* (depending on whether the UE 100 is in idle or inactive mode) determines that the UE 100 should connect to the network 102 using LTE as the RAT. The core network 104 or RAN node 103*a* then sends this specified RAT as part of the paging message to the UE 100. After receiving the paging message, the UE 100 determines that the first cell 105 on which the UE 100 is camping in idle or inactive mode is capable of supporting a connection using LTE communications. The UE 100 then initiates a connection to the network 102 through the first cell 105 using LTE as the RAT.

Figure 5A:
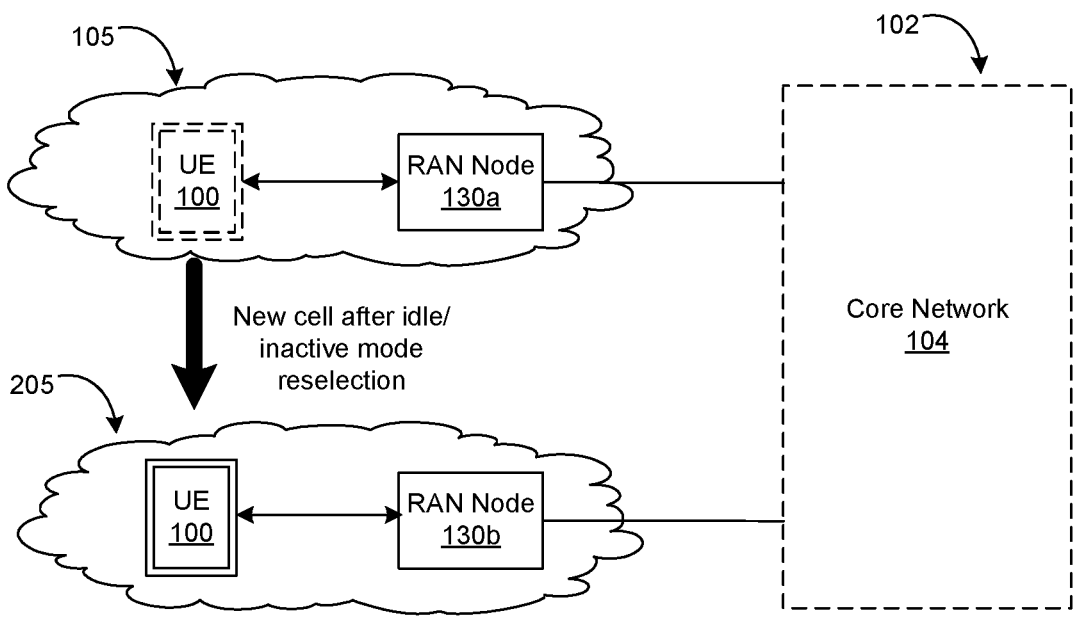
FIG. 5A is a schematic diagram of a user equipment re-selecting from a first cell to a second cell on the same network.
Figure 5B:
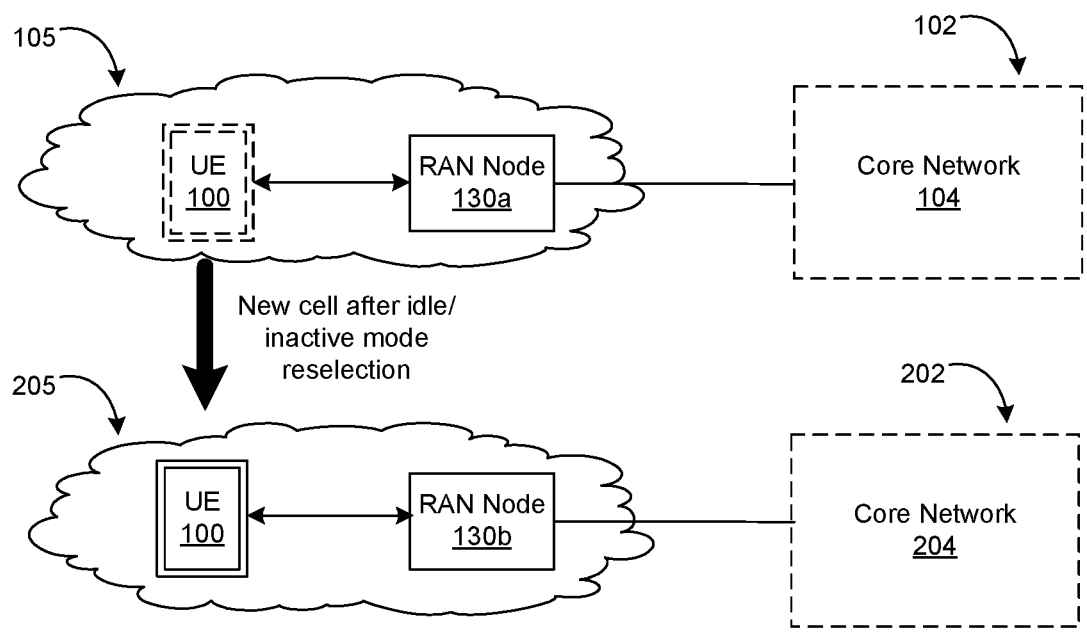
FIG. 5B is a schematic diagram of a user equipment re-selecting from a first cell to a second cell on a different network.

Turning now to FIG. 5A, a user equipment 100 can be camping on a first cell 105 corresponding to a RAN node 130*a*. While camping on the first cell 105, the UE 100 can be in either an idle mode or an inactive mode. As described in detail below, the UE 100 can perform a cell re-selection while in idle or inactive mode, prior to connecting to the network 102. For example, if the first cell 105 is not capable of supporting a connection using a specified RAT, the UE 100 can select a second cell 205 through which to establish a connection with the network 102. As shown in FIG. 5B, in certain embodiments, the cell re-selection can be performed by the UE 100 so that the UE 100 can connect to a second core network 204 of a second wireless communications network 202 that is different from the first network 102. It should be appreciated that while the first cell 105 is depicted as being associated with a single RAN node 130*a* and the second cell 205 is depicted as being associated with a single RAN node 130*b*, a cell can correspond to one or more RAN nodes 130.

Figure 6A:
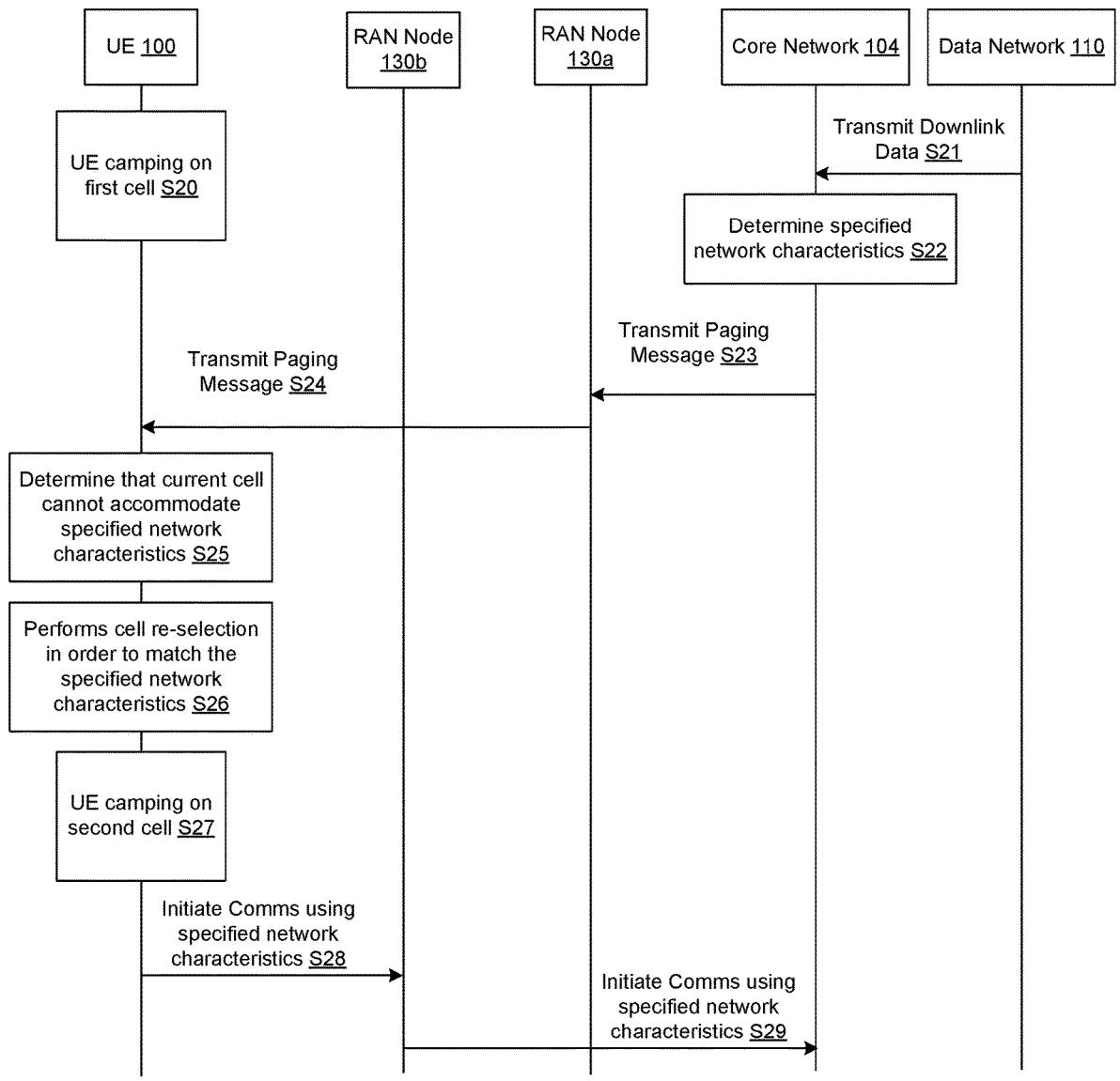
FIG. 6A is an exemplary signaling diagram for signaling among the user equipment and network element during idle mode mobility of the user equipment.
Figure 6B:
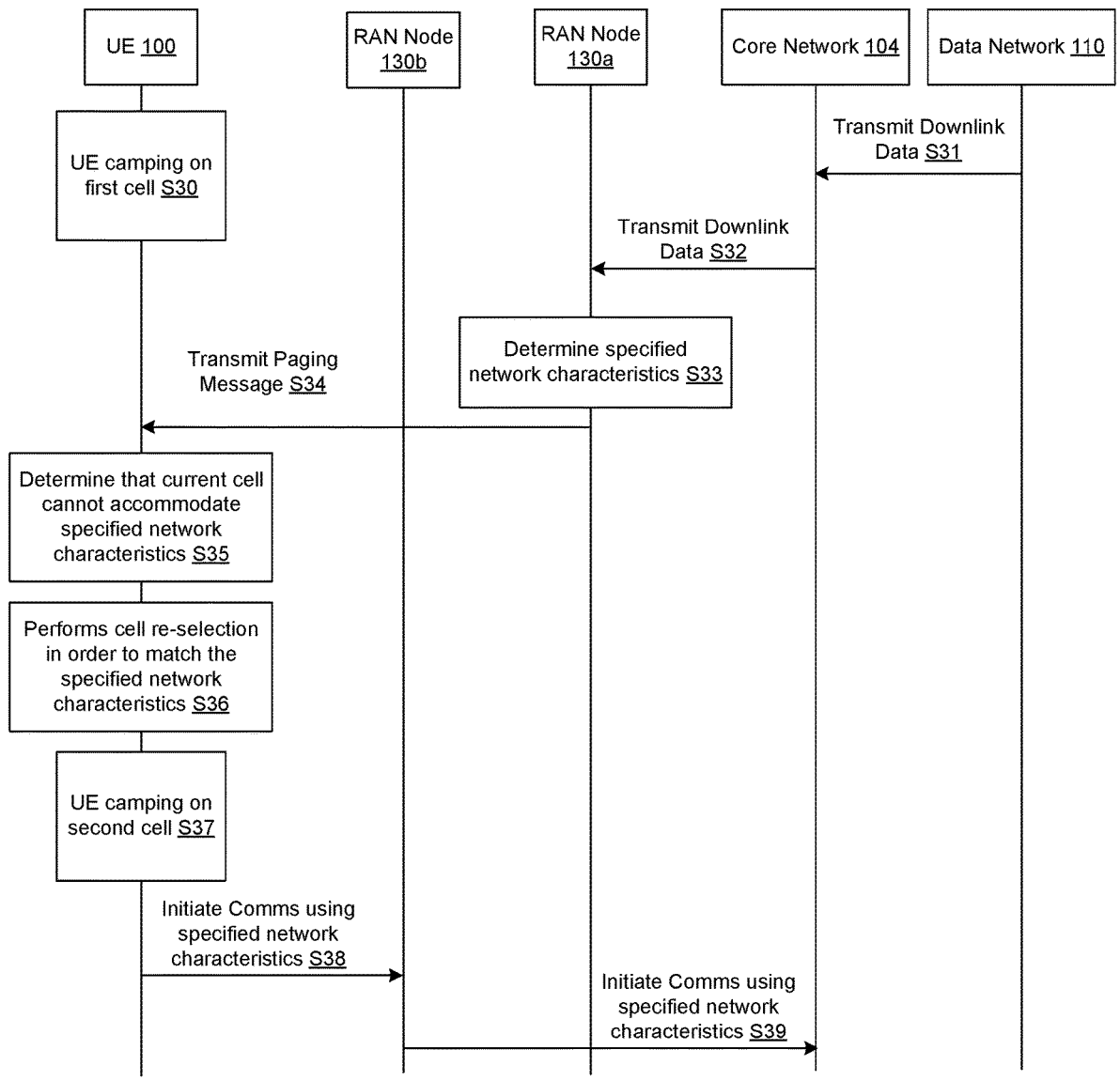
FIG. 6B is an exemplary signaling diagram for signaling among the user equipment and network element during inactive mode mobility of the user equipment.

With reference to FIG. 6A and FIG. 6B, similar techniques and methods can be implemented, but using different network elements in the cases when a UE 100 is in an idle mode or an inactive mode. In other words, even though the methods disclosed herein can be performed by different network elements (e.g. RAN node 130 or the core network 104), the methods are applicable when a UE 100 is camping on the first cell 105 in an idle mode or an inactive mode.

Turning now to FIG. 6A, a signaling diagram is presented, representing an exemplary embodiment of signaling while the UE 100 is in an idle mode. At step S20, the UE 100 is camping on the first cell 105 in idle mode. At step S21, the core network 104 receives downlink data intended for the UE 100 from a data network 110. Upon receipt of the downlink data, the core network 104 at step S22 can determine specified network characteristics including at least one of a specified RAT, a target cell ID, a target wireless communications network, a frequency band or an indication of a specific bandwidth portion within a network carrier. The core network 104 can determine the specified network characteristics based on the downlink data received from the data network 110, and taking into account the UE 100 capabilities. For example, the core network 104 can base the specified network characteristics on the corresponding PDU session and quality of service (QoS) parameters related to the corresponding data flow and take into account stored information about the UE 100 radio access capabilities. Furthermore, the core network 104 could also consider temporary load conditions in different RATs. Determining the specified network characteristics allows the network to realize and decide the best RAT and other network characteristics for the UE 100 to use upon connection, taking into account, for example, current network conditions and UE 100 capabilities.

At step S23, the core network 104 transmits a paging message to RAN node 130*a*. The paging message contains the specified network characteristics or an indication of the specified network characteristics as described above. At step S24, the RAN node 130*a* transmits the paging message containing the specified network characteristics or the indication of the specified network characteristics to the UE 100. At step S25, the UE 100 determines that the current cell (here, the first cell 105) cannot accommodate a connection using the specified network characteristics. For example, the UE 100 can determine that the RAT specified in the paging message cannot be supported by the current cell. After determining that the current cell cannot accommodate the specified network characteristics, at step S26, the UE 100 performs a cell re-selection in order to match the specified network characteristics. The UE 100 can select the second cell 205 as the new cell to initiate the communication with the network. Prior to the UE 100 initiating the communication the UE 100 may as an optional step camp on the second cell in step S27, for example in order to identify the time/frequency resources for performing the connection initiation with the network 102 or 202. In certain situations, the time/frequency resource identification may be performed as part of the cell re-selection procedure. The step of S27 may not be seen as the UE 100 specifically delaying the connection to the network 102 or 202 unless the paging message has included such information, but rather as a necessary step in order to achieve correct information and timing for the expected connection to the network 102 or 202. At steps S28 and S29, the UE 100 initiates communications with the core network 104 through the RAN node 130b (corresponding to the second cell 205) using the specified network characteristics. It should also be appreciated that in certain embodiments, the UE 100 can initiate a connection with an entirely different network (e.g. wireless communications network 202) through the second cell 205 after the cell re-selection. Initiating communications with the network 102 or the network 202 using the specified network characteristics allows the UE 100 to initiate communications using the correct network characteristics (e.g. RAT), thus eliminating the need to perform a handover or reconfiguration after establishing a connection.

FIG. 6B depicts a signaling diagram representing an exemplary embodiment of signaling while the UE 100 is in an inactive mode. At step S30, the UE 100 is camping on the first cell 105 in inactive mode. At step S31, the core network 104 receives downlink data intended for the UE 100 from a data network 110. Upon receipt of the downlink data, the core network 104 at step S32 transmits the downlink data to the RAN node 130a. Recognizing that the UE 100 is camping on the first cell 105 in inactive mode, at step S33, the RAN node 130a can determine specified network characteristics including at least one of a specified RAT, a target cell ID, a target wireless communications network, a frequency band or an indication of a specific bandwidth portion within a network carrier. The RAN node 130a can determine the specified network characteristics based on the downlink data received from the data network 110 and core network 104, and taking into account the UE 100 capabilities. For example, the RAN node 130a can base the specified network characteristics on the corresponding PDU session and quality of service (QoS) parameters related to the corresponding data flow, and take into account stored information about the UE 100 radio access capabilities. Furthermore, the RAN node 130a could also consider temporary load conditions in different RATs.

At step S34, the RAN node 130a transmits a paging message to the UE 100. The paging message contains the specified network characteristics or an indication of the specified network characteristics as described above. Steps S35, S36, S37, S38, and S39 correspond with steps S25, S26, S27, S28, and S29. The UE 100 determines that the current cell cannot accommodate a connection with the specified network characteristics, and proceeds to perform a cell re-selection and may, in certain situations, camp on the second cell 205, or optionally directly proceed to the next step. The UE 100 can then initiate communications with the network 102 or a second network 202 through the second cell 205.

In one example that corresponds with the signaling diagrams of FIG. 6A and FIG. 6B, the core network 104 or RAN node 103a (depending on whether the UE 100 is in idle or inactive mode) determines that the UE 100 should connect to the network 102 using 5G-NR as the RAT. The core network 104 or RAN node 103a then sends this specified RAT as part of the paging message to the UE 100. After receiving the paging message, the UE 100 determines that the first cell 105 on which the UE 100 is camping in idle mode is not capable of supporting 5G-NR communications, but that the second cell 205 is capable of supporting a 5G-NR connection. The UE 100 then performs a cell re-selection while in idle or inactive mode to camp and/or connect to the network 102 or 202 on the second cell 205. At this point, the UE 100 can proceed by initiating a connection to the network 102 or 202 through the second cell 205 using 5G-NR as the RAT.

Figure 7:
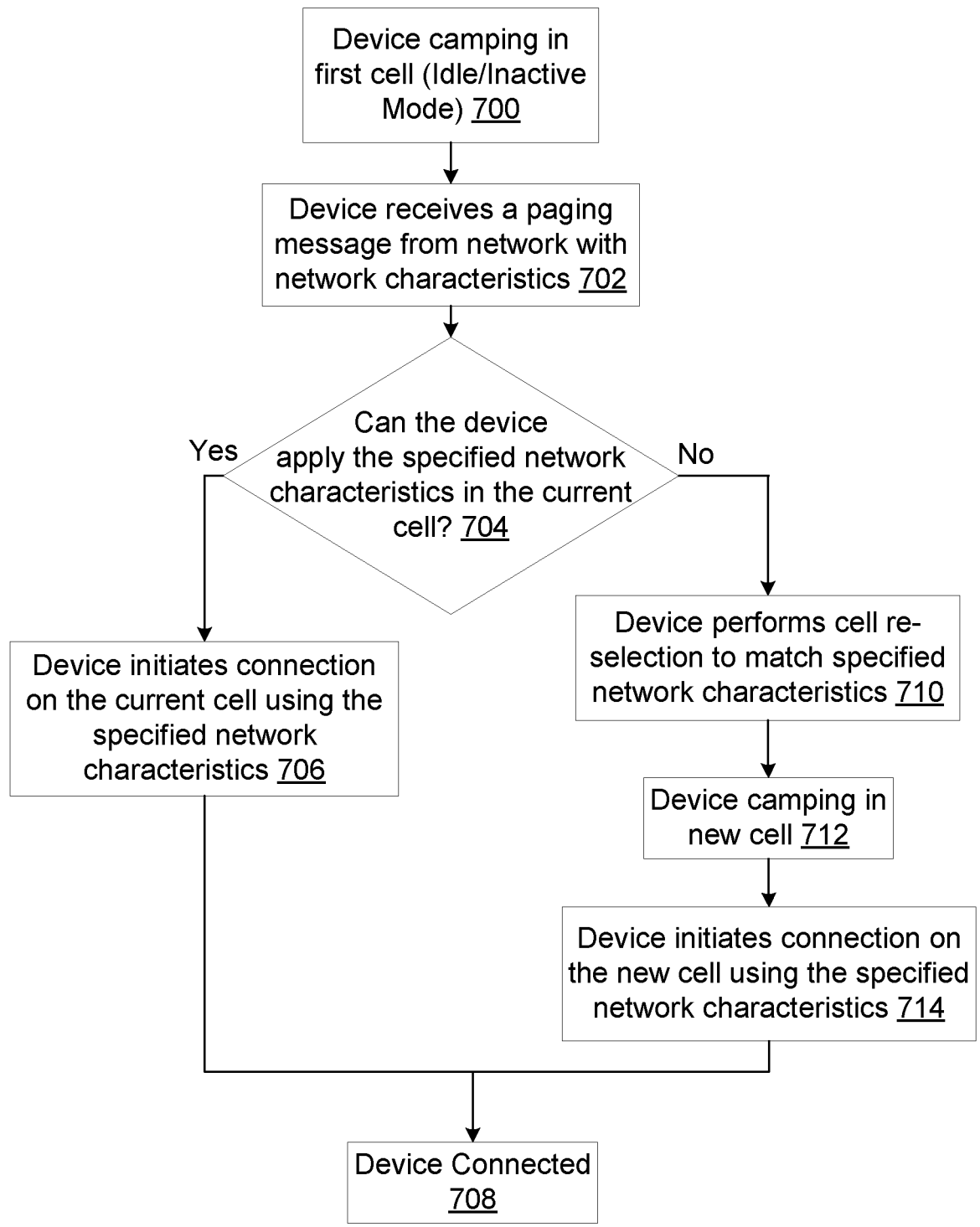
FIG. 7 is a flow diagram of a representative method performed by the user equipment.

Turning now to FIG. 7, a method for initiating a connection to a target wireless communications network carried out by a wireless communications device is described. In this method, the target wireless communications network can be the wireless communications network that the wireless communications device is presently camped on (e.g. network 102), or it can be a different wireless communications network (e.g. network 202). Further, the wireless communications device can be, for example, a user equipment 100.

In block 700, the wireless communications device is camping in an idle mode or an inactive mode on a first cell 105 of a first wireless communications network 102. In block 702, the wireless communications device receives a paging message from a network element on the network 102. The paging message can be received from, for example, a RAN node 103a or a core network 104, and the paging message can include specified network characteristics or an indication of specified network characteristics to be used by the wireless communication device in connecting to the target wireless communications network 102 or 202. As previously described, the specified network characteristics can include at least one of a specified RAT, a target cell ID, a target wireless communications network, a frequency band or an indication of a specific bandwidth portion within a network carrier. In certain embodiments, following the step of receiving the paging message, the wireless communications device can initiate a connection to the target wireless communications network 102 or 202 using the specified network characteristics over one of the first cell 105 or a second cell 205 of the target wireless communications network, based on the specified network characteristics, and wherein the target wireless communications network is one of the first wireless communications network 102 or a second wireless communications network 202. Initiating communications with the network 102 or the network 202 using the specified network characteristics allows the wireless communications device to initiate communications using the correct network characteristics (e.g. RAT), thus eliminating the need to perform a handover or reconfiguration after establishing a connection.

Optionally, before initiating a connection to the target wireless communications network, in block 704, the wireless communications device can determine whether it can initiate a connection to the target wireless communications network on the first cell 105 using the specified network characteristics. For example, the wireless communications device can determine whether the current cell is capable of establishing a connection using the RAT specified by the paging message. The connection to the target wireless communications network is based on the determination of whether or not the wireless communications device can initiate the connection on the first cell 105, as further detailed below.

For instance, if the wireless communications device determines that it can apply the specified network characteristics in the current cell, at block 706, the wireless communications device initiates the connection to the target network using the specified network characteristics. At block 708, the wireless communications device is connected with the target network.

On the other hand, if the wireless communications device determines that it cannot apply the specified network characteristics in the current cell, in block 710, the wireless communications device performs a cell re-selection while in idle or inactive mode to a different cell (e.g. second cell 205) that matches the specified network characteristics. Once the cell re-selection is complete, at block 712, the wireless communications device can optionally camp in the new cell before proceeding to block 714. The wireless communications device can alternatively proceed directly to block 714 after the cell re-selection is complete. At block 714, the wireless communications device initiates a connection with the target network through the new cell (e.g. second cell 205) using the specified network characteristics. At block 708, the wireless communications device is connected with the target network.

Figure 8:
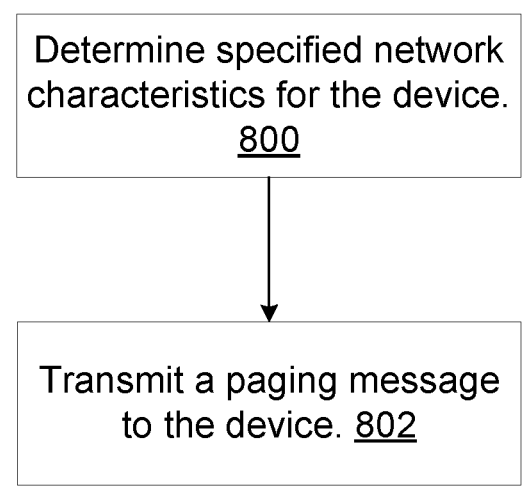
FIG. 8 is a flow diagram of a representative method performed by a network element.

Turning now to FIG. 8, a method performed by a network element (e.g. RAN node 103 or a core network 104) in a first wireless communications network 102 of transmitting a paging message to a wireless communications device is described. At block 800, the network element determines specified network characteristics for the wireless communications device to use for establishing a connection with a target wireless communications network. The target wireless communications network can be the first wireless communications network 102 or the second wireless communications network 202. As previously described, the specified network characteristics can include at least one of a specified RAT, a target cell ID, a target wireless communications network, a frequency band or an indication of a specific bandwidth portion within a network carrier. The specified network characteristics can be determined based at least partially on quality of service (QoS) parameters from a Protocol Data Unit (PDU) session corresponding with downlink data received from the data network and intended for the wireless communications device, and can also take into account stored information about the UE 100 radio access capabilities. In one example, the network element can have stored thereon information pertaining to the RAT capabilities of the UE 100, specifying that the UE 100 is only capable of establishing communications using an LTE connection. In this example, the network element will not decide not to specify 5G-NR in the specified network characteristics, but would rather specify LTE because it conforms to the UE 100 capability. In certain embodiments, the specified network characteristics can also be determined based at least partially on load conditions of a plurality of RATs.

At block 802, the network element transmits a paging message to the wireless communications device. The paging message includes the specified network characteristics or an indication of the specified network characteristics. If the method of FIG. 8 is being performed by the core network 104, then the paging message is sent to the wireless communications device via a RAN node 103.

Figure 9:
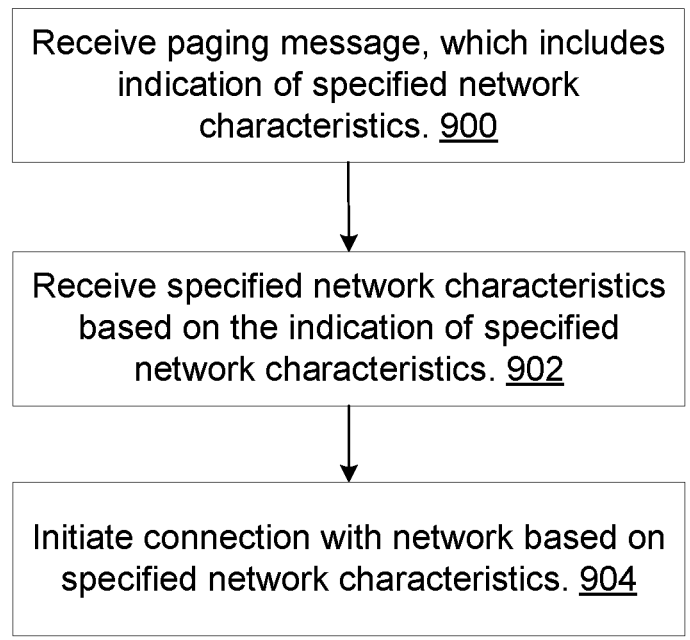
FIG. 9 is a flow diagram of a representative method performed by the user equipment.
Figure 10:
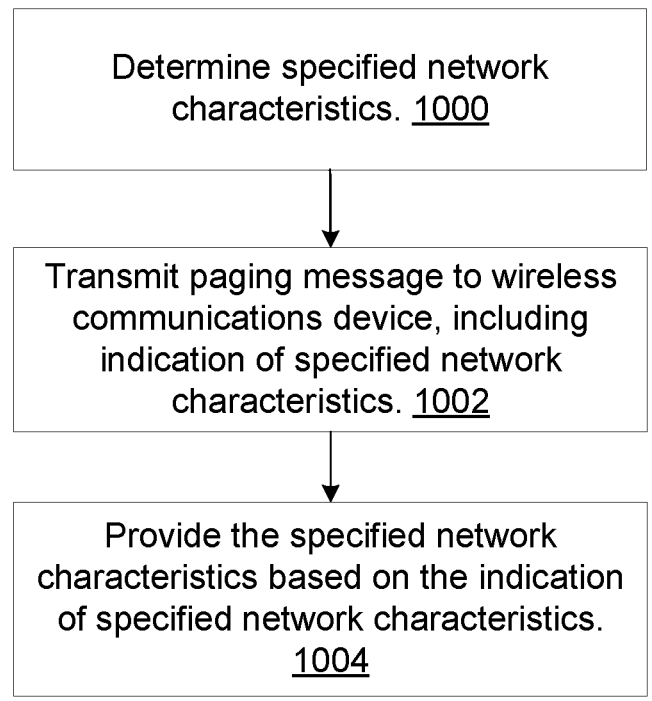
FIG. 10 is a flow diagram of a representative method performed by a network element.

With reference to FIG. 9 and FIG. 10, it should be appreciated that the described methods can be performed as part of, or in conjunction with, the methods described above.

As described above, a wireless communications device can receive a paging message from a network element (e.g. a RAT node 130 or core network 104). In certain embodiments, the paging message includes an indication of the specified network characteristics. The network element may send an indication of the specified network characteristics in situations such as, for example, when the specified network characteristics are too large to be sent directly in the paging message. Sending an indication provides the wireless communications device with the ability to receive the specified network characteristics in these circumstances. Turning now to FIG. 9, at block 900, a wireless communications device receives a paging message, which includes an indication of specified network characteristics. The indication of specified network characteristics can be in the form of a flag or information bit/bits. The indication can be, for example, an address, or a pointer to a specific control transmission that provides the specified network characteristics. In certain embodiments, the indication can be an identifier that informs the wireless communication device of a set of upcoming time and frequency resources where the wireless communication device can receive the specified network characteristics (e.g. RAT characteristics). In certain embodiments, the identifier may point to a system information message that has been, or will be, transmitted by the network 102. In still further embodiments, the identifier may point to control signaling transmitted in a control message by the network 102.

At block 902, the wireless communications device receives the specified network characteristics based on the indication of specified network characteristics. For example, the wireless communications device can receive the specified network characteristics as part of a message following the paging message, or receive the specified network characteristics as part of a message sent on time/frequency resources indicated by the indication in the paging message. At block 904, the wireless communications device initiates a connection with a first or second network 102 or 202 based on the specified network characteristics.

Turning now to FIG. 10, at block 1000, a network element (e.g. RAT node 130, or core network 104) determines specified network characteristics for a wireless communications device to use in connecting with a network 102 or 202. At block 1002, the network element transmits a paging message to a wireless communication device. The paging message includes an indication of the specified network characteristics. The indication of specified network characteristics can be in the form of a flag or information bit/bits. The indication can be, for example, an address, or a pointer to a specific control transmission that provides the specified network characteristics. In certain embodiments, the indication can be an identifier that informs the wireless communication device of a set of upcoming time and frequency resources where the wireless communication device can receive the specified network characteristics (e.g. RAT characteristics). In certain embodiments, the identifier may point to a system information message that has been, or will be, transmitted by the network 102. In still further embodiments, the identifier may point to control signaling transmitted in a control message by the network 102.

At block 1004, the network element provides the specified network characteristics based on the indication of specified network characteristics. For example, the network element can transmit the specified network characteristics as part of a message following the paging message, or transmit the specified network characteristics as part of a message sent on time/frequency resources indicated by the indication in the paging message.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method for initiating a connection to a target wireless communications network carried out by a wireless communications device comprising:
camping in an idle mode or an inactive mode, on a first cell of a first wireless communications network;
receiving a paging message containing specified network characteristics or an indication of specified network characteristics to be used by the wireless communications device in connecting to the target wireless communications network, wherein the specified network characteristics include a radio access technology (RAT);
determining whether or not the wireless communications device can initiate a connection to the target wireless communications network on the first cell using the RAT included in the specified network characteristics;
upon determining that the wireless communications device cannot initiate the connection to the target wireless communications network on the first cell using the RAT included in the specified network characteristics, performing a cell re-selection to a second cell to match the specified network characteristics; and
initiating a connection to the target wireless communications network using the specified network characteristics over the second cell of the target wireless communications network, based on the specified network characteristics, wherein the target wireless communications network is one of the first wireless communications network or a second wireless communications network.

2. The method of claim 1, further comprising determining whether the wireless communications device can initiate a connection to the target wireless communications network on the first cell using the specified network characteristics, wherein initiating the connection to the target wireless communications network is based on the determination of whether the wireless communications device can initiate the connection on the first cell.

3. The method of claim 1, wherein the paging message is received using a different RAT than the RAT included in the specified network characteristics.

4. The method of claim 1, wherein the specified network characteristics include at least one of a target cell ID, a frequency band, a core network type or an indication of a portion of bandwidth within a network carrier of the target network wireless communication network.

5. A wireless communications device comprising a wireless interface and a control circuit configured to:
camp, in an idle mode or an inactive mode, on a first cell of a first wireless communications network;
receive a paging message containing specified network characteristics or an indication of specified network characteristics to be used by the wireless communications device in connecting to the target wireless communications network, wherein the specified network characteristics include a radio access technology (RAT);
determine whether or not the wireless communications device can initiate a connection to the target wireless communications network on the first cell using the RAT included in the specified network characteristics;
upon determining that the wireless communications device cannot initiate the connection to the target wireless communications network on the first cell using the RAT included in the specified network characteristics, perform a cell re-selection to a second cell to match the specified network characteristics; and
initiate a connection to the target wireless communications network using the specified network characteristics over the second cell of the target wireless communications network, based on the specified network characteristics, wherein the target wireless communications network is one of the first wireless communications network or a second wireless communications network.

* * * * *